March 17, 1942.     B. I. HAYFORD     2,276,968
SWITCHGEAR
Filed Feb. 20, 1940     2 Sheets-Sheet 2
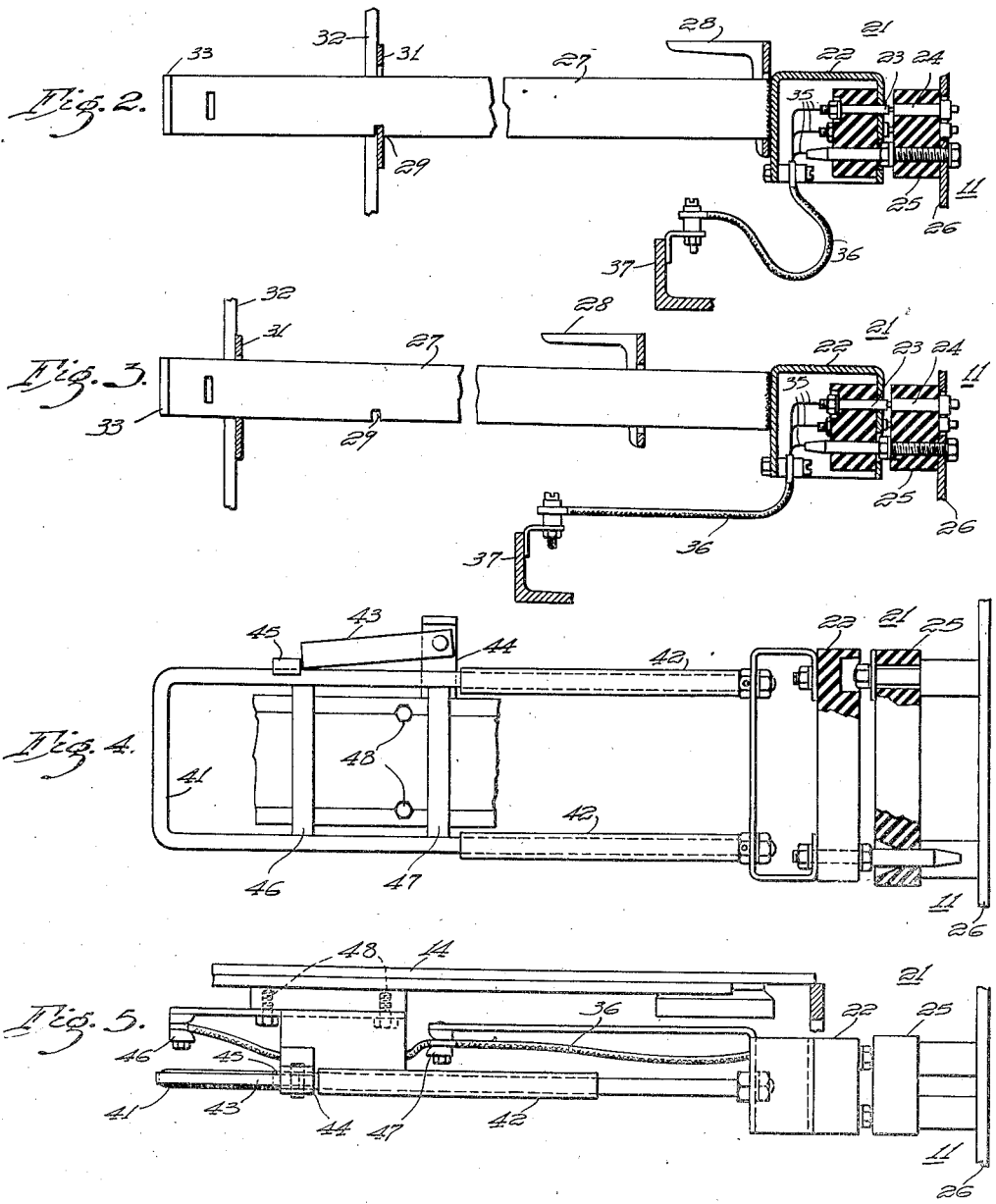
WITNESSES:
INVENTOR
Benjamin I. Hayford
BY
ATTORNEY Patented Mar. 17, 1942

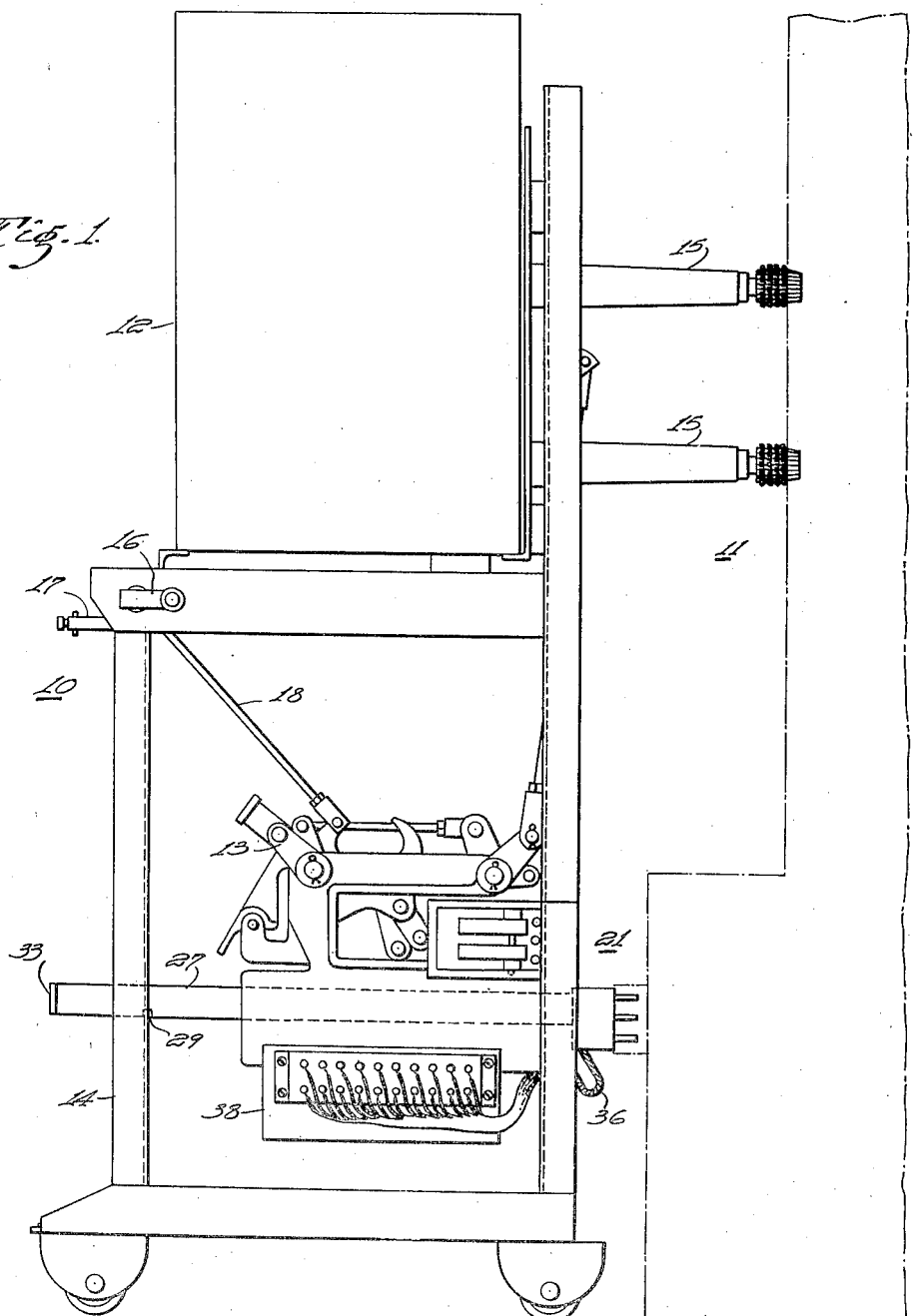

2,276,968

UNITED STATES PATENT OFFICE 2,276,968

SWITCHGEAR

Benjamin I. Hayford, Forest Hills, Pa., assignor to Westinghouse Electric & Manufacturing Company, East Pittsburgh, Pa., a corporation of Pennsylvania Application February 20, 1940, Serial No. 319,886

5 Claims. (Cl. 175—298)

My invention relates, generally, to switchgear and, more particularly, to switchgear of the metal-clad type.

The secondary disconnecting devices of the train line coupler type usually provided with metal-clad switchgear utilize a separate jumper assembly to plug in between the stationary and moving sections of contacts for testing the control connections with the removable circuit breaker unit in the test position. Such an arrangement requires mounting the secondary contacts in a position that is accessible for inserting the jumper. In applying contacts of the foregoing type, particularly to horizontal drawout equipment, it is frequently not convenient to locate them in a position which is accessible when the circuit breaker unit is in the test position.

An object of my invention, generally stated, is to provide a secondary disconnecting device for metal-clad switchgear which shall be simple and efficient in operation and which may be economically manufactured and installed.

A more specific object of my invention is to provide for operating a secondary disconnecting device for metal-clad switchgear from in front of the removable switchgear unit.

Another object of my invention is to provide a secondary disconnecting device which may be placed at any desired location in a metal-clad switchgear structure.

A further object of my invention is to provide a secondary disconnecting device for a removable breaker unit which cannot be disconnected when the breaker unit is in the operating position.

Other objects of my invention will be explained fully hereinafter or will be apparent to those skilled in the art.

According to my invention, one section of the secondary disconnecting device for a metal-clad switchgear unit is so mounted that it can be moved into engagement with the other section by means of a bar or lever to make contact without moving the main switchgear unit, thereby making it possible to mount the secondary contacts in the most convenient position for wiring with the space available.

For a fuller understanding of the nature and objects of my invention, reference may be had to the following detailed description, taken in conjunction with the accompanying drawings, in which:

Figure 1 is a view, in side elevation, of switchgear structure embodying my invention;

Figs. 2 and 3 are enlarged views of the secondary disconnecting device utilized in the structure shown in Fig. 1, the circuit breaker truck being in the operating position in Fig. 2 and in the test position in Fig. 3;

Fig. 4 is a view, in elevation, of a modified form of the secondary disconnecting device, with the circuit breaker truck in the operating position, and Fig. 5 is a view, in plan, of the secondary disconnecting device shown in Fig. 4, with the breaker truck in the test position.

Referring to the drawings, and particularly to Fig. 1, the structure shown therein includes a removable breaker unit 10 and a cell 11, only the outline of which is shown, for housing the breaker unit. The removable unit 10 comprises a circuit breaker 12, having an operating mechanism 13, which is mounted on a truck 14.

The circuit breaker 12 may be of any well known type, and is provided with primary disconnecting contact members 15 for engaging cooperating contact members disposed in the cell structure when the truck 14 is fully inserted into the cell to what is commonly known as the operating position of the removable breaker unit. The truck 14 is provided with a mechanical levering mechanism 16 which is operated by a shaft 17 in a manner well known in the art to move the breaker unit in the cell from the test position to the operating position, or vice versa. In accordance with the usual practice, the levering mechanism is interlocked with the circuit breaker operating mechanism by means of an interlocking rod 18 to prevent the truck unit from being withdrawn from the cell to separate the primary disconnecting contacts when the circuit breaker is in the closed position, and also to prevent the truck from being inserted into the cell with the breaker in the closed position.

It is the usual practice to provide the removable unit and the cell structure with cooperating secondary disconnecting contact means for establishing the necessary control circuits for controlling the operation of the circuit breaker mechanism and also any other apparatus which may be mounted on the removable unit. As explained hereinbefore, secondary disconnecting devices of the train line coupler type have been utilized in metal enclosed switchgear. When such devices are utilized, it has been the practice to provide a removable jumper for plugging in between the stationary section and the movable section of the secondary disconnecting device when the breaker unit is in the test position, in order that the breaker mechanism may be tested.

However, it is frequently difficult to mount the secondary disconnecting device in a position where it will be readily accessible for the insertion of the jumper cable, particularly with removable units of the horizontal drawout type such as illustrated herein.

In order to overcome the foregoing difficulty, I have provided a secondary disconnecting device 21 which is so mounted at the rear of the removable unit 10 that it may be operated from in front of the removable unit, thereby making it unnecessary to attach a jumper cable to the secondary disconnecting device.

Referring to Figs. 2 and 3, the secondary disconnecting device 21 comprises a movable portion 22 having contact members 23 disposed to engage cooperating contact members 24 in the stationary portion 25 of the disconnecting device which is mounted on a wall 26 of the cell 11. The movable portion 22 is carried by a lever 27, one end of which is slidably disposed in a slot provided in a portion 28 of the framework of the truck 14. A notch 29 is provided near the other end of the lever 27, and is disposed to engage a plate 31 secured to another portion 32 of the frame work of the truck 14. The lever 27 is provided with a handle 33 which extends to the front of the truck 14, as shown in Fig. 1.

The contact members 23 of the secondary disconnecting device are connected to wires 35 disposed in a flexible cable 36 which is supported by a cross member 37 on the truck 14. As shown, in Fig. 1 the wires from cable 36 may be connected to a terminal board 38 which is mounted on the breaker mechanism and in this manner the proper connections from the breaker mechanism to the corresponding terminals in the cell structure are established when the breaker unit is in the operating position as shown in Fig. 2. Furthermore, it will be seen that it is impossible to disconnect the secondary disconnecting device when the breaker unit is in the operating position, since the member 28 of the truck structure prevents the movable portion 22 of the disconnecting device from being withdrawn from the stationary portion 25.

When the breaker unit is moved to the test position, as shown in Fig. 3, the portions 28, 32 and 37 of the truck framework are in the relative positions shown in Fig. 3. With the truck in this position, the movable portion 22 of the secondary disconnecting device may be actuated into engagement with the stationary portion 25 by raising the lever 27 to disengage the notch 29 and pushing the lever forward to the position shown in Fig. 3. The cable 36 is of sufficient length to permit the disconnecting devices to be engaged when the breaker unit is in the test position. If it is desired to leave the secondary disconnecting device in engagement when the truck is being moved from the operating to the test position, the lever 27 may be raised to disengage the notch 29, while the truck is being moved from the operating to the test position, thereby leaving the secondary disconnecting device in engagement.

It will be noted that the lever 27 is not locked in the position shown in Fig. 3. Thus, if the truck is in the test position, it may be pushed into the operating position without raising the lever 27. The notch 29 automatically engages the plate 31 when the truck is fully inserted into the operating position. In this manner the secondary disconnecting device may be operated from in front of the truck structure by means of the handle 33 of the lever 27 which is accessible at all times. However, it is impossible to disconnect the secondary contact members when the breaker is in the operating position, thereby precluding the possibility of the control connections for the breaker unit being broken while the breaker is in operation.

In the embodiment of the invention shown in Figs. 4 and 5, in which like parts are designated by the same reference characters as in Figs. 1, 2 and 3, the movable portion 22 of the secondary disconnecting device 21 is carried by a U-shaped lever 41, the arms of which are slidably disposed in tubes 42 mounted on the truck framework. A latch 43 which is pivotally mounted on a member 44 of the truck structure 14 is disposed to engage a stop 45 on the lever 41.

The tubes 42 are so disposed that it is impossible to separate the movable portion 22 from the stationary portion 25 of the secondary disconnecting device when the breaker unit is in the operating position. However, when the breaker unit is in the test position, as shown in Fig. 5, the latch 43 may be raised to permit the lever 41 to slide through the tubes 42 to push the movable portion 22 of the secondary disconnecting device into engagement with the stationary portion 25.

In the structure shown in Figs. 4 and 5, the connections to the cable 36 may be made at a terminal or wiring cleat 46 which is disposed at the front of the truck structure where it is more accessible for wiring than in the structure shown in Figs. 1, 2 and 3, thereby facilitating the wiring operations. An additional wiring cleat 47 is provided on the disconnecting device for supporting the cable 36. With this modifications of the invention the cable 36 may be assembled with the disconnecting device before it is mounted on the truck and the complete assembly then secured to the truck frame 14 by bolts 48.

The operation of the device shown in Figs. 4 and 5 is similar to that described hereinbefore for the structure shown in Figs. 1, 2 and 3.

From the foregoing description, it is apparent that I have provided a secondary disconnecting device for metal-enclosed switchgear which may be utilized with switchgear of the vertical lift type as well as with the horizontal drawout type. It is also evident that the movable portion of the disconnecting device may be mounted in the cell, if desired. Furthermore, the operation of the device is facilitated, since the operating handle may be so positioned that it is readily available to the operator. Also the installation of the device is facilitated since it may be so located in the truck structure that the wiring connections may be readily made.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. The combination with a stationary cell and a breaker unit movable from an operating position in the cell to a test position, of a secondary disconnecting device comprising a stationary portion mounted in the cell and a movable portion carried by the breaker unit, means carried by the breaker unit for actuating the movable portion of the secondary disconnecting device when the breaker unit is in the test position, said actuating means being operable from in front of the breaker unit, and means on the breaker unit for preventing movement of the disconnecting device when the breaker unit is in the operating position.

2. The combination with a stationary cell and a breaker unit movable from an operating position in the cell to a test position, of a secondary disconnecting device comprising a stationary portion mounted in the cell and a movable portion carried by the breaker unit, means carried by the breaker unit for actuating the movable portion of the secondary disconnecting device when the breaker unit is in the test position, said actuating means being operable from in front of the breaker unit, and means pivotally mounted on the breaker unit for releasably latching said movable portion in a predetermined position.

3. The combination with a stationary cell and a breaker unit movable from an operating position in the cell to a test position, of a secondary disconnecting device comprising a stationary portion mounted in the cell and a movable portion carried by the breaker unit, means carried by the breaker unit for actuating the movable portion of the secondary disconnecting device into and out of engagement with the stationary portion when the breaker unit is in the test position, said means being slidably disposed on the breaker unit and operable from the front thereof, and means for preventing disengagement of the disconnecting device when the breaker unit is in the operating position.

4. The combination with a stationary cell and a breaker unit movable from an operating position in the cell to a test position, of a secondary disconnecting device comprising a portion mounted in the cell and a cooperating portion mounted on the breaker unit, means for moving one of said portions relative to the breaker unit into and out of engagement with the other of said portions when the breaker unit is in the test position, and means for preventing disengagement of the disconnecting device when the breaker unit is in the operating position.

5. The combination with a stationary cell and a breaker unit movable from an operating position in the cell to a test position, of a secondary disconnecting device comprising a portion mounted in the cell and a cooperating portion mounted on the breaker unit, means for moving one of said portions relative to the breaker unit when the breaker unit is in the test position, and means for preventing movement of the disconnecting device when the breaker unit is in the operating position.

BENJAMIN I. HAYFORD.